US012440093B2

(12) United States Patent
Silbermann et al.

(10) Patent No.: US 12,440,093 B2
(45) Date of Patent: Oct. 14, 2025

(54) ENDOSCOPE COMPRISING A BIOPSY VALVE

(71) Applicant: AMBU A/S, Ballerup (DK)

(72) Inventors: Victor Silbermann, Them (DK); Alistair David Morton, Kastrup (DK)

(73) Assignee: AMBU A/S, Ballerup (DK)

( * ) Notice: Subject to any disclaimer, the term of this patent is extended or adjusted under 35 U.S.C. 154(b) by 417 days.

(21) Appl. No.: 18/178,032

(22) Filed: Mar. 3, 2023

(65) Prior Publication Data
US 2023/0277047 A1  Sep. 7, 2023

(30) Foreign Application Priority Data
Mar. 4, 2022 (DE) .......................... 102022105143.9

(51) Int. Cl.
*A61B 1/00* (2006.01)
*A61B 1/018* (2006.01)

(52) U.S. Cl.
CPC .......... *A61B 1/018* (2013.01); *A61B 1/00131* (2013.01); *A61B 1/00066* (2013.01)

(58) Field of Classification Search
CPC . A61B 1/00137; A61B 1/018; A61B 1/00131; A61B 1/00066; A61B 17/3462
USPC .............................. 600/101, 154; 604/288.03
See application file for complete search history.

(56) References Cited

U.S. PATENT DOCUMENTS

| 4,653,477 A * | 3/1987 | Akui ................. A61B 1/00137 128/912 |
| 5,879,288 A | 3/1999 | Suzuki et al. |
| 6,117,070 A | 9/2000 | Akiba |
| 7,226,411 B2 * | 6/2007 | Akiba .................... A61B 1/018 600/154 |

(Continued)

FOREIGN PATENT DOCUMENTS

| AU | 2010201956 A1 | 12/2011 |
| EP | 0784961 A1 | 7/1997 |

(Continued)

OTHER PUBLICATIONS

Search report in European Application No. 23158797.3, 8 pgs., dated Jul. 6, 2023.

(Continued)

*Primary Examiner* — Anh Tuan T Nguyen
*Assistant Examiner* — James Edward Boice
(74) *Attorney, Agent, or Firm* — Faegre Drinker Biddle & Reath LLP (57) ABSTRACT

An endoscope including: a handle; and an insertion cord; the handle including: a working channel access port providing access to a working channel extending from the handle to a distal tip unit of the insertion cord; and a biopsy valve attached or attachable to the working channel access port; the biopsy valve including: a valve body attached or attachable to the working channel access port; and a valve lid configured to be detachably attached to the valve body; wherein the valve lid includes a slit which is formed or configured so as to close and seal the working channel (Continued)

access port and which provides a passageway for insertion of the tool or instrument; and wherein the slit includes at least one slit end arranged in a weakened portion determining a defined crack-growth direction starting from the at least one slit end.

22 Claims, 6 Drawing Sheets

(56) References Cited

U.S. PATENT DOCUMENTS

| | | | |
|---|---|---|---|
| 8,702,596 B2* | 4/2014 | Kaye | A61B 1/00137 128/205.24 |
| 9,622,776 B2 | 4/2017 | Oberlaender et al. | |
| 10,478,046 B2 | 11/2019 | Ogi | |
| 11,166,622 B2 | 11/2021 | Ubbesen et al. | |
| 11,166,624 B2 | 11/2021 | Ubbesen et al. | |
| 11,291,355 B2 | 4/2022 | Lund et al. | |
| 2007/0179341 A1 | 8/2007 | Okada | |
| 2011/0118544 A1 | 5/2011 | Adams et al. | |
| 2014/0187866 A1 | 7/2014 | Kaye et al. | |

FOREIGN PATENT DOCUMENTS

| | | |
|---|---|---|
| EP | 0880977 B1 | 10/2004 |
| EP | 2389882 A1 | 11/2011 |
| EP | 1695656 B1 | 2/2016 |
| EP | 2574270 B1 | 4/2017 |
| EP | 3184023 A1 | 6/2017 |
| EP | 2564756 B1 | 11/2017 |
| EP | 3772322 A1 | 2/2021 |
| JP | H0373127 A | 3/1991 |
| JP | 3434551 B2 | 8/2003 |
| JP | 4338482 B2 | 10/2009 |
| JP | 4904195 B2 | 3/2012 |
| WO | 2008101286 A1 | 8/2008 |
| WO | 2014140265 A1 | 9/2014 |

OTHER PUBLICATIONS

Search report in related German Patent Application No. 10 2022 105 143.9, dated Nov. 10, 2022.

* cited by examiner

ENDOSCOPE COMPRISING A BIOPSY VALVE

CROSS-REFERENCE TO RELATED APPLICATIONS

This application claims priority from and the benefit of German Patent Application No. DE 10 2022 105 143.9, filed Mar. 4, 2022; said application is incorporated by reference herein in its entirety.

TECHNICAL FIELD

The present disclosure relates to endoscopes with working channel access ports. More particularly, the present disclosure relates to biopsy valves attached or attachable to the working channel access port.

BACKGROUND

Endoscopes, both reusable and disposable (i.e. single-use), are used for visual examination and diagnosis of hollow organs and body cavities, as well as to assist in surgery, e.g. for a targeted tissue sampling. Endoscopes include procedure-specialized endoscopes, for example arthroscopes, bronchoscopes, cholangioscopes, colonoscopes, cystoscopes, duodenoscopes, gastroscopes, laparoscopes, ureteroscopes, and others. Endoscopes usually comprise a handle, via which an operator/user can hold and control the endoscope, and an insertion cord connected to the handle and comprising an insertion tube, an actively bendable bending section and a distal tip unit. The insertion cord is configured to be inserted into the hollow organs and body cavities of a patient. Steering wires, a working channel tube, power cables, etc. are usually provided inside the insertion cord.

The handle may comprise a working channel access port, which provides access to a working channel extending from the working channel access port to the distal tip unit of the insertion cord. The working channel is usually formed by a connector part, the so-called biopsy connector or Y-connector, a flexible working channel tube arranged inside the handle, the insertion tube and the bending section, and a tip housing of the distal tip unit. A surgical tool or instrument may be guided through the working channel into the patient's body cavity, i.e. distally with respect to the tip of the endoscope. Additionally, the working channel is usually also used as a suction channel to aspirate for example body fluid from an operation area within the patient's body cavity and may also be used for injecting flushing fluid there through. The handle may comprise a biopsy valve, which may be detachably attached to the working channel access port, and which closes and hermetically seals the working channel access port while allowing insertion of the tool or instrument into the working channel.

A biopsy valve is usually formed from a resilient, flexible material and comprises a straight slit for insertion of tools and/or instruments. When no instrument or tool is inserted into the slit, the slit is usually self-closing to hermetically close and seal the working channel access port. The slit defines lid lips that seal the working channel access port. Inserting an instrument or tool into the slit and thus pushing open the slit may require relatively high forces. This may disadvantageously lead to buckling of tools or instruments, which are rather long and have a small diameter. In this light it is desirable to use a low-friction, elastic, flexible material for the biopsy valves. For a single-use endoscope, this should preferably be a material which is commercially available and can be manufactured with low cost, in particular via (injection) molding of polymer material.

It has however appeared that low-friction, elastic, flexible, commercially available and low-cost materials often have a relatively low tear strength. Therefore, when an instrument or tool is inserted into the slit of such a biopsy valve and the slit is thus pushed open, the material of the biopsy valve adjacent/at ends of the slit may crack or tear. Cracks often grow and propagate in different directions, in particular in directions inclined/transverse/at an angle with respect to the extension direction of the slit. This disadvantageously leads to the biopsy valve being not tight anymore when suction is applied inside the working channel from a suction source connected to the working channel. Further, a flap may be formed by the cracks/tears and the flap may vibrate in the airflow, which leads to an undesired whistling sound when suction is applied in the working channel.

It is desirable to provide a low-cost biopsy valve suitable for single-use endoscopes which avoids formation of flaps that may vibrate in the airflow in the area of the self-closing slit.

BRIEF DESCRIPTION OF THE DISCLOSURE

The tasks and objectives of the present disclosure are to eliminate or at least to reduce the disadvantages of the related art. In particular, an endoscope shall be provided, which is designed for single use and which has a biopsy valve made of a low-friction, elastic, flexible, commercially available and low-cost material and comprising a self-closing slit, wherein the biopsy valve preferably avoids a formation of flaps vibrating in the airflow in the area of the self-closing slit, and wherein a tool or instrument can be inserted into the biopsy valve without requiring high forces and without buckling of the respective tool or instrument.

The present disclosure relates to an endoscope comprising a working channel access port and a biopsy valve comprising attached or attachable to the working channel access port, the biopsy valve having a lid with a slit having a slit end adjacent a weakened portion of the lid, the weakened portion defining a crack-growth direction.

The endoscope may further comprise a handle and an insertion cord configured to be inserted into a patient's body cavity, the working channel access port providing access to a working channel extending from the handle to a distal tip unit of the insertion cord; and the biopsy valve configured to close and seal the working channel access port while allowing insertion of a tool or instrument into the working channel; the biopsy valve comprising: a valve body attached or attachable to the working channel access port; and the valve lid (or plug) configured to be detachably attached to the valve body; the self-closing slit formed or configured so as to close and seal the working channel access port and providing a passageway for insertion of the tool or instrument. The weakened portion may defined the crack-growth direction starting from the slit end.

It is accepted that a crack or tear extending in a specific, defined (crack-growth) direction may form starting from at least one of the slit ends when the tool or instrument is inserted. When a weakened portion determining said defined crack-growth direction starting from the slit end is provided, it is advantageously possible to control a crack growth/a crack propagation direction to avoid formation of flaps vibrating in the airflow. Moreover, it is possible to maintain a rather good sealing ability around the inserted tool or instrument when the crack grows or propagates in a defined direction. In particular, a set of slitted lid lips formed by the slit may suitably seal around the inserted tool or instrument. To prevent flaps, the crack-growth direction should not be perpendicular or at a large angle to an extending direction of the slit.

Preferably, a first slit end and a second slit end of the self-closing slit are provided/arranged in weakened portions. I.e. the first slit end of the self-closing slit is preferably provided in a first weakened portion determining a first defined crack-growth direction starting from the first slit end, and the second slit end of the self-closing slit is preferably provided in a second weakened portion determining a second defined crack-growth direction starting from the second slit end. When both ends of the self-closing slit, which is essentially an elongated and narrow opening, are arranged in weakened portions, it is possible to guide or direct cracks propagating from both slit ends into desired directions when an instrument or tool is inserted into the passageway provided by the slit.

According to a preferred embodiment, the first defined crack-growth direction determined by the first weakened portion is a direction, which is essentially opposite to the second defined crack-growth direction determined by the second weakened portion. Said differently, the first defined crack-growth direction and the second defined crack-growth direction are preferably parallel, opposite, aligned with each other and form essentially an angle of 180°. This especially helps to avoid the formation of flaps vibrating in the airflow and compromising the sealing ability of the valve lid.

The self-closing slit is preferably formed as a single, straight slit, which extends linearly/in a straight line. Preferably, an extension direction of the slit corresponds to the defined crack-growth direction(s). The slit may also be formed in other shapes, for example in the shape of a crossed slit, curved, kinked, sinusoidal, or the like, as long as it suitably hermetically closes and seals the working channel access port and provides the passageway for insertion of the tool or instrument.

The at least one weakened portion provided at a slit end is preferably formed as a recessed portion, i.e. as a portion of reduced material thickness. In case both slit ends are arranged in weakened portions, it is preferable if both weakened portions are formed as recessed portions, i.e. as portions of reduced material thickness. The weakened portion is thus preferably formed by locally reducing a material thickness according to a preferred embodiment, in particular by reducing the material thickness by at least 25% or more.

The present invention is not limited to the weakened portion being a recessed portion. The weakened portion might alternatively also be formed as a predetermined breaking line formed by piercing the material of the valve lid adjacent the slit end(s) in a line such that a number of short-distanced piercing points adjacent the slit end(s) define the desired crack-growth direction starting from the slit end(s).

Preferably, the first recessed portion and the second recessed portion are separate from each other, i.e. are not interconnected. However, it may also be preferable if the first recessed portion and the second recessed portion are connected to each other. According to such an alternative embodiment, there may be provided one single elongated recess with the slit formed within said one recess and with the first recessed portion and the second recessed portion being portions of said one recess. Said differently, said one recess may basically surround the slit and the first recessed portion may be a portion of the recess in the area at/around/adjacent the first slit end and the second recessed portion may be a portion of the recess in the area at/around/adjacent the second slit end. The recess may form a sloped or inclined surface providing a guiding structure for guiding the tool or instrument towards and into the slit and providing an increased flexibility directly adjacent the slit and thus a decreased required insertion force for inserting the tool or instrument.

In case the weakened portion is formed as a recessed portion, the recessed portion may be described as a chocolate-bar like predetermined tearing or cracking line. In particular, similarly like a chocolate bar breaks or cracks along/at predetermined breaking lines, which are formed by recessed portions, the material of the valve lid cracks and a crack propagates along the crack-growth direction defined and determined by the recessed portion.

Preferably, the valve lid comprises a radial outer engagement/attachment portion and a radial inner partition wall portion. The radial outer engagement/attachment portion is preferably integrally formed with the radial inner partition wall portion.

The radial outer engagement/attachment portion of the valve lid is preferably configured to be detachably and sealingly attached to the valve body, preferably via form fit, and may be described as a clamp like, plug like or bracket like portion.

The self-closing slit is preferably provided in the radial inner partition wall portion. Therefore, also the weakened portion(s), in particular the recessed portion(s), is (are) preferably provided in the radial inner partition wall portion. The radial inner partition wall portion is preferably formed as a thin-walled portion provided in an axially extending instrument insertion passage. The radial inner partition wall portion is preferably a wall (portion) which extends perpendicularly to an axial direction of the biopsy valve/to the axially extending instrument insertion passage and may be considered as a barrier or obstacle when the instrument or tool is inserted into the axially extending instrument insertion passage. In particular, the instrument or tool has to push open the slit provided in the radial inner partition wall portion when inserted into the instrument insertion passage. Further, the radial inner partition wall preferably surrounds the slit and forms a sealing rim or sealing lip (a set of slitted lips) for sealing against tools or instruments inserted through the slit.

Preferably, the valve lid comprises cavities/chambers/recesses above and below the partition wall portion in the axial direction of the valve lid, so that the instrument or tool can be relatively easily inserted into the biopsy valve, in particular without being impaired by other portions of the valve lid apart from the partition wall portion. In a state in which the valve lid is attached to the valve body, i.e. in an attached state of the biopsy valve, a side of the valve lid in the axial direction above the partition wall portion, i.e. facing a user holding the handle/closer to the user, may be designated as proximal side of the valve lid and a side of the valve lid in the axial direction below the partition wall portion, i.e. facing the working channel access port/further away from the user holding the handle, may be designated as distal side of the valve lid.

According to a preferred embodiment the weakened portion, in particular the recessed portion, may extend from the slit end in the defined crack-growth direction and towards and into the radial outer engagement/attachment portion of the valve lid. In case both slit ends are arranged in weakened portions, it is preferable if both weakened portions extend from the respective slit ends in the respective defined crack-growth directions and towards and into the radial outer engagement/attachment portion of the valve lid. Since the radial outer engagement/attachment portion preferably—contrary to the partition wall portion—extends axially, in particular axially away from the partition wall portion both towards the proximal side and the distal side, the engagement/attachment portion constitutes a particularly strengthened/reinforced portion limiting and preventing further crack growth, particularly in case a large crack forms when the instrument or tool is inserted into the biopsy valve.

In case the weakened portion is formed as a recessed portion, it may be preferable if the recessed portion has a groove shape with an essentially triangular cross-section, in particular when viewed in the crack-growth direction determined by the recessed portion. A tip of said essentially triangular cross-section may form a bottom of the recessed portion. The slit preferably ends in the recessed portion, in particular at said tip of the triangular cross-section forming the bottom of the recessed portion. According to this preferred embodiment the crack-growth direction starting from the slit end is particularly well defined, namely along the tip of said essentially triangular cross-section.

In case the weakened portion is formed as a recessed portion, it may be preferable if the recessed portion is arranged at the proximal side of the partition wall portion. If two recessed portions are provided it may be preferable if both recessed portions are arranged at the proximal side of the partition wall portion. However, the recessed portion or recessed portions may also be arranged at the distal side of the partition wall portion. Further alternatively, in case of two recessed portions it may also be provided that one of the recessed portions is arranged on the proximal side of the partition wall portion and one of the recessed portions is arranged on the distal side of the partition wall portion.

Preferably, the partition wall portion comprises a first distal or lower wall surface and a second proximal or upper wall surface and a first diameter of the first distal wall surface is smaller than a second diameter of the second proximal wall surface, which limits the growth of the tears or cracks. Preferably, the recessed portions are formed on the second proximal wall surface. This preferably goes along with the radial outer engagement/attachment portion of the valve lid extending radially further inward, in particular directly adjacent the partition wall portion, on the distal side of the partition wall portion than on the proximal side of the partition wall portion. A length of the slit is preferably smaller/shorter than the first diameter. It is thus possible that the slit will crack along the crack-growth directions defined by the recessed portions, since the slit ends are provided in the thin-walled partition wall portion, and that a crack growth/propagation is suitably limited by the radial outer engagement/attachment portion. In particular, a crack grows both in the defined crack-growth direction and axially through the partition wall portion, and reaches a periphery of the partition wall portion first on the distal side of the partition wall portion due to the smaller first diameter, which suitably limits the growth of the cracks. In particular, this makes it possible that axial crack growth is preferably prevented or slowed at the distal side of the partition wall portion so that the crack growth mainly continues at the proximal side of the partition wall portion due to the bigger second diameter until the crack also reaches the periphery of the partition wall portion on the proximal side. Therefore, the crack growth/propagation is suitably guided into the radial outer engagement/attachment portion of the valve lid and limited/stopped there due to an increasing wall thickness provided in particular in the axial direction.

Preferably, the valve lid comprises a distal chamber/cavity/recess below the partition wall portion, i.e. on the distal side of the partition wall portion, in the axial direction of the valve lid. The distal side is preferably a side of the partition wall portion facing towards the working channel access port when the valve body is attached to the working channel access port and the valve lid is attached to the valve body. The distal chamber/cavity/recess preferably has the shape of a truncated cone such that the distal chamber, in particular a circumferential wall of the distal chamber, tapers/narrows towards the partition wall portion. Said differently, a diameter of a circumferential wall of the distal chamber preferably corresponds to the above-mentioned first diameter directly adjacent the partition wall portion and continuously increases in a direction away from the partition wall portion. This configuration (the smaller first diameter in combination with the truncated cone-shaped chamber) has the particular advantage that the partition wall portion is suitably supported by the radial outer engagement/attachment portion from below/the distal side, in particular when suction is applied to the working channel, which makes the partition wall portion more stable.

Preferably, the valve lid further comprises a proximal chamber/cavity/recess above the partition wall portion, i.e. on the proximal side of the partition wall portion, in the axial direction of the valve lid. Preferably, the above-mentioned second diameter of the proximal wall surface of the partition wall portion corresponds to a diameter of a cylindrical surface/portion of the proximal chamber directly adjacent the partition wall portion. Preferably, the cylindrical portion of the proximal chamber directly adjacent the partition wall portion is essentially perpendicular to the partition wall portion. The proximal chamber may have a protective collar surface or portion axially adjacent the cylindrical portion and projecting/extending radially inward with respect to the cylindrical portion. The proximal chamber may further have a funnel-shaped/cone-shaped instrument guide surface or portion axially adjacent the collar portion. In particular, the funnel-shaped/cone-shaped instrument guide surface or portion is provided and configured to suitably guide the tool or instrument to be inserted into the biopsy valve directly towards the slit. Further, the protective collar portion is preferably provided and configured to guide the tool or instrument centrally towards the slit so that the tool or instrument does not enter the slit at a position too close to slit ends and thus too close to the weakened/recessed portion(s), and is further provided and configured to prevent tools or instruments having a diameter too large for the valve lid of the biopsy valve from entering the biopsy valve through the slit.

The radial outer engagement/attachment portion of the valve lid on a radial outer side preferably comprises a first radially outward protruding portion, a second radially outward protruding portion and an annular groove portion between the first radially outward protruding portion and the second radially outward protruding portion in the axial direction. Due to this configuration, the radial outer engagement/attachment portion may basically also be described as a bracket or clamp like portion.

The valve lid may have a grip portion in addition to the radial outer engagement/attachment portion and the radial inner partition wall portion, wherein the grip portion preferably extends radially outward from the engagement/attachment portion and is configured/provided to be gripped by a user/operator.

The valve lid is preferably connected to the valve body via a connecting strip/strap. Therefore, it is possible to detach the valve lid from the valve body, e.g. by pulling on the grip portion of the valve lid, wherein the valve lid remains connected to the valve body via the connecting strip/strap which makes it possible to easily attach the valve lid again to the valve body, since the valve lid will not be lost but remains in close proximity to the valve body even in the detached state. Further, the biopsy valve can thus be manufactured as one single integral part.

The insertion cord of the endoscope preferably comprises an insertion tube, an actively bendable bending section and a distal tip unit. The working channel is preferably formed by a connector part, the so-called biopsy connector or Y-connector, a flexible working channel tube arranged inside the handle, the insertion tube and the bending section, and a tip housing of the distal tip unit. The working channel access port may be a portion of the connector part, in particular of a biopsy channel of the connector part.

The biopsy valve having the valve body and the valve lid preferably has an essentially cylindrical shape and provides a radial inner instrument insertion passage. The valve body is preferably a cylindrical body and is preferably configured to be detachably attached to the working channel access port. The valve lid or plug may form an essentially cylindrical attachment body configured to be detachably attached to the valve body at a side opposite to the working channel access port.

The working channel access port may comprise an access port engagement portion, onto which the biopsy valve may be detachably attached. In particular, the working channel access port may comprise an annular groove behind a bulged rim portion/barb portion.

The biopsy valve is preferably detachably attached to the working channel access port, especially preferred via form fit. In particular, the valve body is detachably attached to the working channel access port. The valve body is preferably formed as an essentially cylindrical body having a first engagement portion formed at a first end of the cylindrical body, wherein the first engagement portion is provided/configured to be engaged with the (corresponding) access port engagement portion of the working channel access port. The cylindrical body further preferably has a second engagement portion formed at a second end of the cylindrical body, wherein the second end is opposite the first end, and wherein the second engagement portion is provided/configured to be engaged with the (corresponding) engagement portion of the valve lid.

The valve body preferably comprises a constricted valve body passage/passageway for insertion of the tool or instrument. The constricted valve body passage/passageway is preferably formed as a constricted opening/hole in a valve body partition wall. The valve body partition wall is preferably arranged between the first engagement portion and the second engagement portion in an axial direction of the cylindrical valve body. When the valve lid is attached to the valve body, the slit forming the valve lid passage/passageway and the constricted opening/hole forming the valve body passage/passageway are preferably axially aligned. When providing a valve body with a constricted passageway and a valve lid or plug with a slit that is normally closed in order to maintain the working channel access port of the biopsy channel substantially in a hermetically closed state, it is possible to push open the slit upon introducing an instrument or tool into the biopsy valve and to guide the instrument or tool through the slit and the constricted opening provided in the valve body into the biopsy channel and thus also into the working channel of the endoscope. In the case of a narrow or small-diameter instrument, it is relatively easy to maintain fluid tightness because the slit is opened only in a small degree. On the contrary, when a thick or big-diameter instrument is introduced into the biopsy valve, the slit may be opened wide to such a degree as to brake its air tightness. However, since the constricted passage of the valve body is provided in addition to the slit, the thick instrument spreads the constricted passage radially outward when it is introduced into the biopsy channel, and walls/lips of the constricted passage tightly fit around the inserted instrument to form a hermetical seal there around. Therefore, while an instrument is introduced into a body cavity through the biopsy valve for a biopsy or surgical treatment, there is little possibility of body fluids flowing in a reverse direction and coming out through an inlet opening of the biopsy channel and depositing on the manipulating hand of the operator. In case of a big-diameter instrument it may also be preferable to detach the valve lid from the valve body before inserting the instrument or tool.

The endoscope according to the present disclosure is preferably a single-use endoscope. This means that the endoscope is preferably optimized for single use. The endoscope preferably has a limited number of elements, which are preferably manufactured with a low-cost material (polymer/plastic/resin) in preferably a low-cost manufacturing process (plastic/injection molding) and which can be easily assembled. Compared to traditional reusable endoscopes, the focus of the present disclosure is to provide an endoscope which is only used once and which thus does not have to withstand rather aggressive cleaning processes and general harsh handling over the life cycle of the endoscope. The biopsy valve is thus preferably made of a low-cost commercially available material. The material is preferably a flexible/soft/elastic polymer material, in particular an elastomer or a thermoplastic elastomer. Example materials include rubber, a silicone rubber or a thermoplastic rubber. Especially preferred, the material used for the biopsy valve can be processed in a molding process, in particular in an injection-molding process. The material is preferable a low-friction material, making it possible that rather low forces are required for insertion of the tool or instrument into the biopsy valve, in particular without buckling of the respective tool or instrument. Further, the biopsy valve is preferably a single/integral part. However, the valve body and the valve lid may alternatively be separate parts, which can be detachably attached to each other. Since the endoscope according to the present disclosure is preferably discarded after its use, it is particularly acceptable that the biopsy valve is damaged during its use (via the formation of the crack in the specific/defined direction), as long as the sealing ability around the tool or instrument can be maintained to some extent and as long no undesired flaps vibrating in the airflow are formed during said one single use.

The present disclosure further relates to a system comprising an endoscope as described above and a monitor connectable to the endoscope.

BRIEF DESCRIPTION OF THE DRAWINGS

The disclosure is explained in more detail below using preferred embodiments and referring to the accompanying figures.

DETAILED DESCRIPTION

The present disclosure provides an endoscope comprising a working channel access port and a biopsy valve attached or attachable to the working channel access port and configured to close and seal the working channel access port while allowing insertion of a tool or instrument into the working channel. The biopsy valve comprises a valve lid including an insertion passage having a proximal (or outer) chamber and a distal (or inner) chamber separated by a lid partition wall extending across the insertion passage. The lid partition wall includes at least one weakened portion adjacent a slit, the weekend portion defining a tear direction. The tear direction may be at an angle that is within +1-30 degrees from a plane traversing the slit, preferably within +1-20 degrees, and more preferably within +1-10 degrees. In this context the term "within" includes the value that defines the tear direction angle.

The lid partition wall may comprise first and second weakened portions and a slit extending between the first and second weakened portions. When a tool or instrument is inserted into the insertion passage it traverses the proximal chamber then pushes through the slit to reach the distal chamber. The instrument may cause the slit to increase in length or propagate, which may be referred to as a tear or crack-growth. The recessed portions are configured to propagate the slit or crack in a desired tear manner and direction.

Advantageously, the weakened portions of the biopsy valve avoid formation of flaps that might vibrate due to airflow in the working channel access port. The vibration of flaps may produce a whistling sound that is avoided by the desired slit propagation, without requiring high instrument insertion force and without buckling of the tool or instrument.

Figure 1:
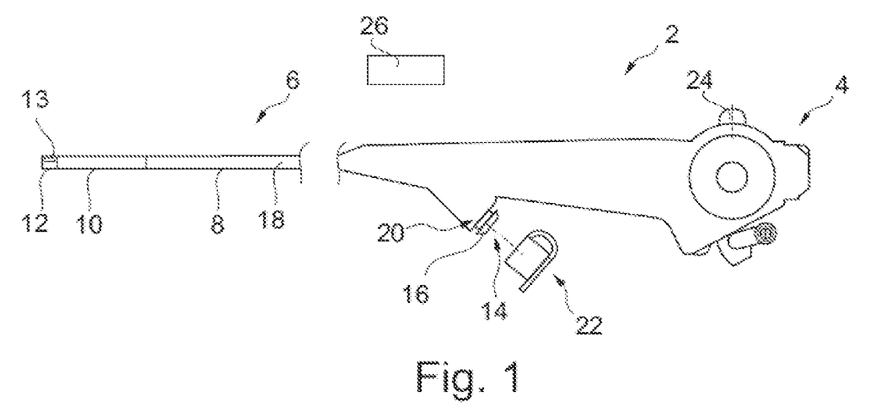
FIG. 1 shows a side view of an endoscope according to the present disclosure.

FIG. 1 shows a side view of an endoscope 2 according to the present disclosure, which is preferably a single-use endoscope. The endoscope 2 comprises a handle 4 and an insertion cord 6 extending distally from the handle 4. The insertion cord 6 is configured to be inserted into a patient's body cavity and comprises an insertion tube 8, a bending section 10 and a distal tip unit 12. The endoscope 2 further comprises a working channel 14 which extends from a working channel access port 16 provided at the handle 4 to the distal tip unit 12. The working channel 14 comprises a lumen of a working channel tube 18, which is arranged inside the handle 4, the insertion tube 8 and the bending section 10. The working channel access port 16 is part of a Y-connector 20, which is connected to the working channel tube 18. A biopsy valve 22 is provided which can be detachably attached to the working channel access port 16. The handle 4 comprises an operating unit 24, formed as a lever, for actively bending the bending section 10 of the insertion cord 6. The endoscope 2 includes an image sensor 13 and is connectable to a monitor 26 via a connecting cable or wirelessly. Thus, the endoscope and the monitor may comprise wireless transceivers to exchange image data and configuration data for the image sensor. The endoscope may comprise a battery to power the image sensor and the LEDs. Examples of monitors 26 are briefly described with reference to FIGS. 13 and 14.

A positioning interface, or interface, functions to control the position of the insertion cord 6. The handle 4 is an example of a positioning interface and, unless stated otherwise, the terms are used interchangeably. The positioning interface also functions to provide the steering controls, e.g. knobs, levers, buttons, and the like, used to steer the tip of the insertion cord 6, which includes the camera, and the elevator controls. Alternatively, a different positioning interface can be provided that is connected to the insertion cord and is detachably connected to a robotic arm. In a further alternative, the positioning interface is detachably connected to the insertion cord and is therefore reusable. In this example the positioning interface may be affixed to a robotic arm. The insertion cord thus extends from the robotic arm, and the intrusive medical device is detachable from the robotic arm. The robotic arm responds to signals, including voice commands from an operator, to rotate, translate, and otherwise position the proximal end of the insertion cord, as an operator would do manually. The positioning interface can include control actuators, including manual control actuators. Alternatively or additionally, control actuators can be provided in or on the robotic arm or by the robotic system including the robotic arm, thereby potentially reducing the cost of the intrusive medical device. Example control actuators include single axis actuators, including linear motion actuators. A linear motion actuator may comprise a threaded rod coupled to a threaded nut portion, in which a motor rotates the rod to translate the nut portion.

Single-use endoscopes optimize workflow and reduce cost while saving patient's lives and improving patient care. They optimize workflow and reduce cost because they are always ready when needed without the traditional large-scale capital and repair budgets required for reusable endoscopes. For example, a sterilization and storage facility is avoided, there is no need to maintain evidence of sterilization, and there is no need to transport endoscopes from sterilization and storage facilities to the buildings where they are needed, sometimes in the middle of the night or weekends. They save patient's lives and improve patient care because they are readily available and do not pose a cross-contamination risk. This also reduces hospital re-admissions. While single-use endoscopes are disposed after a single patient use (one or more procedures may be performed while the patient remains in the treatment room), the environmental impact of re-useable endoscopes, due to cleaning materials, $CO_2$ emissions during the cleaning process, and use of disposable personal protective equipment by personnel involved in transportation and sterilization of the re-useable endoscopes, is similar to that of single-use endoscopes. Studies are emerging showing that the environmental impact of single-use endoscopes may, in fact, be less than that of re-usable endoscopes. To further reduce environmental impact, the endoscopes according to the present disclosure are primarily made of polymer materials. Non-polymer materials are typically used for the steering wires, insertion tube or shaft, and electronics components, such as the camera(s), light emitting diodes, circuit boards and components connected to the circuit boards. Endoscopes with elevator bars may include a metal elevator bar wire. The distal tip part may be made, except for the electronic components and wires, exclusively of polymer materials. Metal adapter rings, metal screws, and other non-polymeric components may thus be excluded from the distal tip part. As the focus on reducing environmental impact continues, for example by using polymeric wires as described in commonly owned U.S. Pat. No. 11,291,355, issued on Apr. 5, 2022, the environmental impact of single-use endoscopes will likely continue to shrink.

Figure 2:
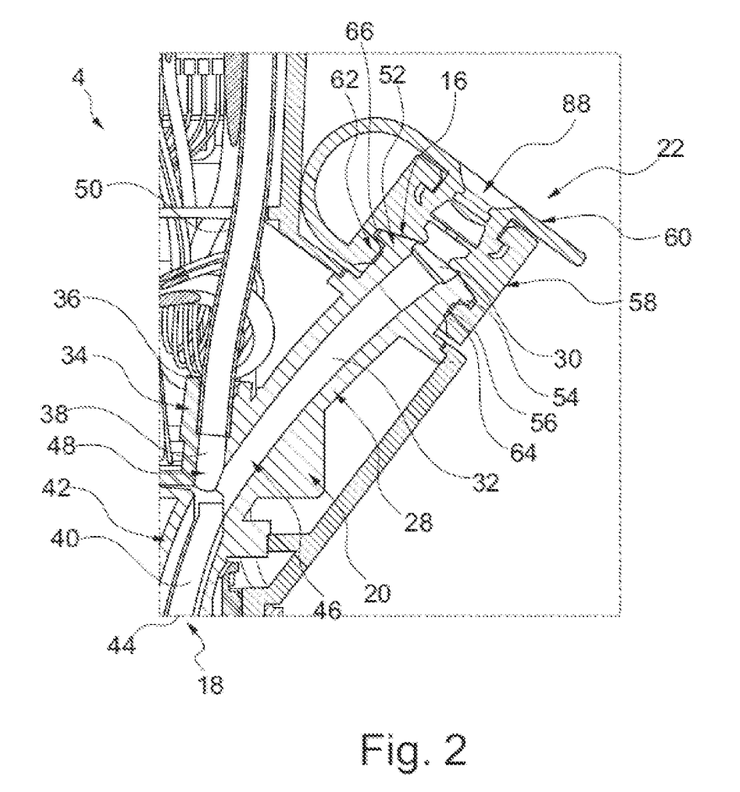
FIG. 2 shows a sectional view through a portion of an handle including a working channel access port and a biopsy valve.

FIG. 2 shows a sectional view through a portion of the handle 4 including the Y-connector 20 having the working channel access port 16. The Y-connector 20 comprises a first branch or socket 28 having a first opening 30. A first channel 32, preferably a biopsy channel, extends from the first opening 30 inside the first branch or socket 28. The Y-connector 20 further comprises a second branch or socket 34 with a second opening 36. A second channel 38, which is preferably a part/portion of a suction channel, extends from the second opening 36. The first channel 32 and the second channel 38 join each other/merge into each other to form a third joined channel 40. The third joined channel 40 extends inside a third branch or socket 42 towards a third opening 44. The first channel 32 and the third joined channel 40 form together an instrument insertion channel 46, through which an instrument may be inserted into the working channel tube 18, which is connected to the third opening 44. The second channel 38 and the third joined channel 40 form together a suction channel 48, through which fluid is sucked out of the patient's body cavity. Therefore, the second opening 36 is connected to a suction tube 50. The working channel access port 16 comprises an access port engagement portion 52 onto which the biopsy valve 22 is detachably attached. The access port engagement portion 52 is formed by a bulged rim or barb portion 54 and an annular groove portion 56 behind said bulged rim or barb portion 54.

Figure 3:
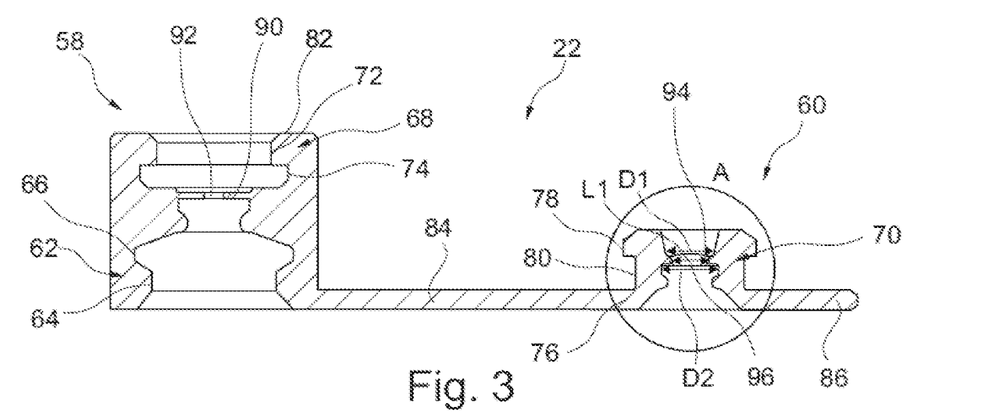
FIG. 3 is a cross-sectional view of the biopsy valve.
Figure 4:
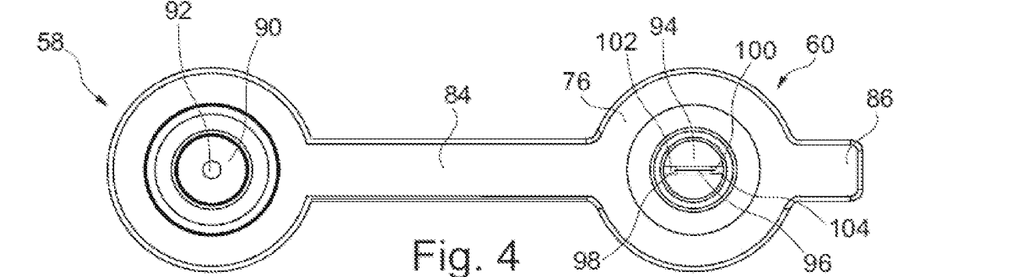
FIG. 4 is a plan view of the biopsy valve.

The biopsy valve 22 comprises a valve body 58 and a valve lid 60. The biopsy valve 22 may be an elastic, integral part made from a low-friction, low-cost and injection-moldable polymer material, in particular a rubber, silicone rubber or thermoplastic elastomer, for example a silicone rubber material with a tear strength, measured by the American Standards method ASTM D 624 B, of less than 50 N/mm, preferably equal to or less than 40 N/mm, and more preferably equal to or less than 35 N/mm. A preferred embodiment of the biopsy valve 22 according to the present disclosure is better illustrated in FIG. 3 and FIG. 4, wherein FIG. 3 is a cross-sectional view of the biopsy valve 22 and FIG. 4 is a plan view of the biopsy valve 22. Both FIG. 3 and FIG. 4 show the biopsy valve 22 in a state disassembled from the working channel access port 16 and in a state, in which the valve lid 60 is detached from the valve body 58.

The valve body 58 comprises a first body engagement portion 62 provided at a distal end of the valve body 58, which is in engagement, preferably via form-fit, with the access port engagement portion 52. The first valve body engagement portion 62 comprises a body projecting portion 64 projecting radially inward and an adjacent annular body groove portion 66. In FIG. 2 the bulged rim or barb portion 54 of the working channel access port 16 is accommodated in the annular body groove portion 66 of the valve body 58 and the body projecting portion 64 of the valve body 58 is accommodated in the annular groove portion 56 of the working channel access port 16, so as to provide a form-fit-connection between the valve body 58 and the working channel access port 16.

The valve body 58 also comprises a radially inner body partition wall portion 90 having a central constricted opening or hole 92. The body partition wall portion 90 is axially provided between the first valve body engagement portion 62 and the second valve body engagement portion 68.

Figure 9:
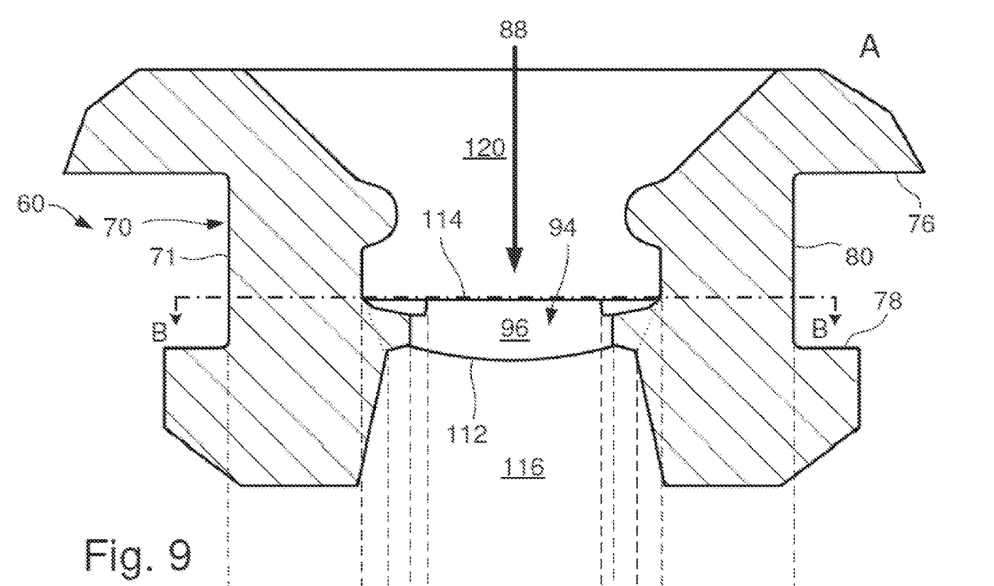
FIGS. 9 to 12 are views of examples of lids and slits.
Figure 10:
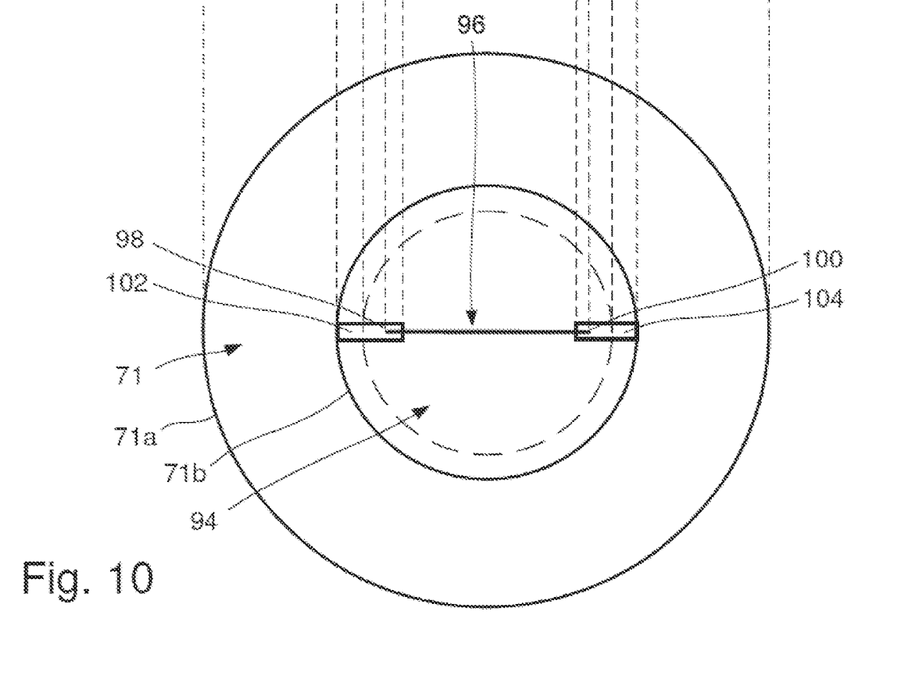

The valve lid 60 provides a radially inner, axially extending instrument insertion passage 88, with reference to FIGS. 2, 9 and 10, for insertion of a surgical tool or instrument, the instrument insertion passage 88 having constricted passages/passageways. Generally, the instrument insertion passage 88 comprises a distal chamber 116 and a proximal chamber 120 separated by a lid partition wall, or wall portion, 94 (best seen in FIG. 9). The valve lid 60 includes a lid engagement or attachment portion 70 comprises an annular lid wall 71 having a first ring, or radially outward protruding portion, 76, a second ring, or radially outward protruding portion, 78 and an annular groove 80 axially between the first ring 76 and the second ring 78. The annular lid wall 71 defines the instrument insertion passage 88. The first ring 76 may be part of a strap 84. The lid partion wall 94 includes a self-closing slit 96 extending between first and second recessed portions 102 and 104 and forming a valve lid passage or passageway. When an instrument is inserted into the insertion passage 88 it traverses the proximal chamber 120 then pushes through the slit 96 to reach the distal chamber 116. The instrument may cause the slit 96 to increase in length or propagate into the recessed portions 102 and 104, which are designed to propagate in a desired manner and direction.

The lid partition wall 94 surrounds the slit 96 and forms a sealing rim or sealing lips for sealing against tools or instruments inserted through the slit 96. When an instrument or tool is inserted into the biopsy valve 22, the slit 96 is pushed open and the instrument or tool can be guided through the slit 96 and the constricted opening 92 provided in the valve body 58 into the first channel or biopsy channel 32 of the Y-connector 20 and thus also into the working channel 14 of the endoscope 2. When a narrow or small-diameter instrument is inserted into the insertion passage 88, the slit 96 is opened only to a small degree and air tightness can be easily maintained. When a rather thick or big-diameter instrument is introduced, the slit 96 may be opened wide to such a degree as to brake its air tightness. However, since the constricted opening 92 is provided in addition to the slit 96, the big-diameter instrument spreads the constricted opening 92 radially outward as it is introduced into the insertion passage 88, and the constricted passage provided by the constricted opening 92 tightly fits around the inserted instrument to form a hermetical seal there around. Therefore, while an instrument is introduced into a body cavity through the biopsy valve 22 for a biopsy or surgical treatment, there is little possibility of body fluids flowing in a reverse direction and coming out through the biopsy valve 22 and depositing on the hand of an operator. Further, when a very big-diameter instrument is to be introduced, the valve lid 60 may also be detached from the valve body 58 before inserting the instrument or tool.

Figure 6:
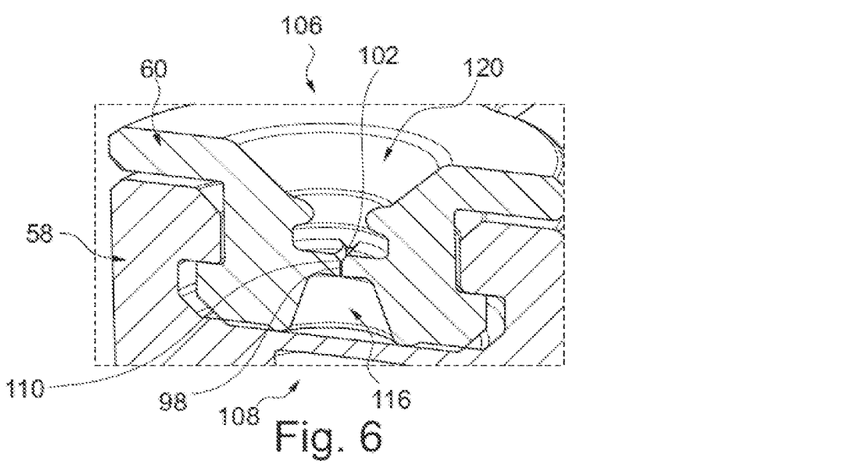
FIG. 6 is an enlarged cross-sectional view of the valve lid attached to a valve body of the biopsy valve.

As can be seen in particular in FIG. 3, the valve body 58 comprises further a second valve body engagement portion 68 provided at a proximal end of the valve body 58, which is provided and configured to be brought into engagement, preferably via form-fit, with the lid engagement or attachment portion 70. In particular, the second valve body engagement portion 68 comprises a body projecting portion 72 projecting radially inward and an adjacent annular body groove portion 74. When the valve lid 60 is detachably attached to the valve body 58 as shown in FIG. 2, the second radially outward protruding portion 78 of the valve lid 60 is accommodated in the annular body groove portion 74 of the valve body 58, and the body projecting portion 72 of the valve body 58 is accommodated in the annular groove 80 of the valve lid 60, so as to provide a sealing form-fit-connection between the valve lid 60 and the valve body 58. The first radially outward protruding portion 76 of the valve lid 60 lies on a proximal end surface 82 of the valve body 58, as best seen in FIG. 6.

The valve lid 60 may be connected to the valve body 58 via a strap 84. The strap 84 is connected to the valve lid 60 at a radially outer position of the first radially outward protruding portion 76 and is connected to the valve body 58 at a radially outer position of the first valve body engagement portion 62. The valve lid 60 comprises a handle portion 86 which extends radially outward, in particular from the first radially outward protruding portion 76 of the valve lid 60. The handle portion 86 preferably extends in a direction, which is opposite to a direction into which the strap 84 extends. By gripping the valve lid 60 at the handle portion 86, it is possible to pull the valve lid 60 off the valve body 58 so that the valve lid 60 can be detached from the valve body 58, if necessary or desired. In a variation of the present embodiment, the strap 84 is omitted.

Figure 5:
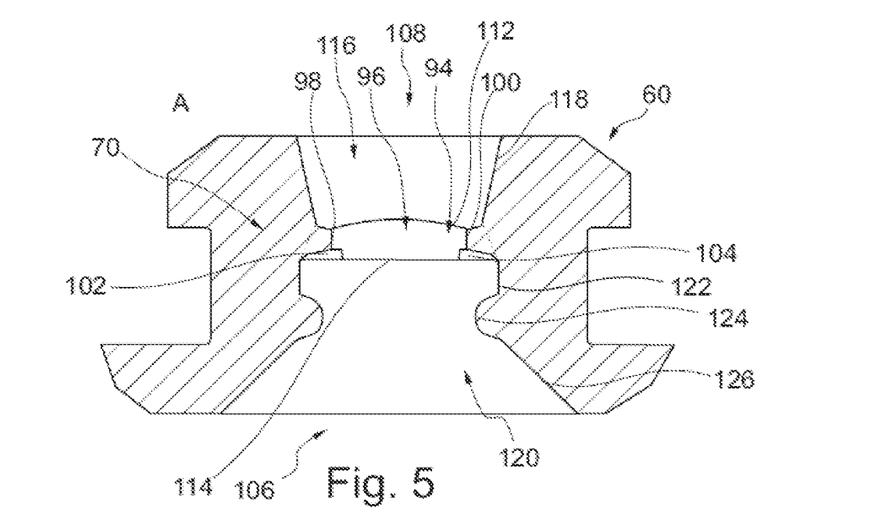
FIG. 5 is an enlarged cross-sectional view of a valve lid of the biopsy valve.

FIGS. 5 and 9 shows detail A marked in FIG. 3 and is thus an enlarged cross-sectional view of the valve lid 60. FIG. 6 is an enlarged cross-sectional view of the valve lid 60 attached to the valve body 58. The valve lid 60 according to a preferred embodiment of the present disclosure is described with particular reference to FIG. 5 and FIG. 6. The slit 96 provided in the valve lid 60 is a self-closing slit, which closes and seals the working channel access port 16. The slit 96 is formed as an elongated and narrow slit, and extends in a straight line, with reference also to FIG. 4. The slit 96 comprises a first slit end 98 and a second slit end 100. The first slit end 98 and the second slit end 100 are end portions of the slit 96, i.e. form the ends of the slit 96. As seen in FIGS. 4 and 5, the first slit end 98 is arranged in a first recessed portion 102 of the lid partition wall portion 94 and the second slit end 100 is arranged in a second recessed portion 104 of the lid partition wall portion 94. In other words, the slit 96 extends into the first and second recessed portions 102, 104. In one variation, the slit is slightly shorter and reaches the beginning (in the longitudinal direction of the slit) of the first and second recessed portions 102, 104 but does not extend into them. In a further variation, the slit is even slightly shorter and almost reaches the beginning (in the longitudinal direction of the slit) of the first and second recessed portions 102, 104, leaving a small unslit portion between the slit ends and the beginning of the recessed portions. The thickness of the unslit portion shall be small enough that the unslit portion will tear and the tear will propagate as described above, via the first and second recessed portions 102, 104. In FIG. 6 the cross-sectional view is taken right at a position where the first slit end 98 is arranged.

Figure 7:
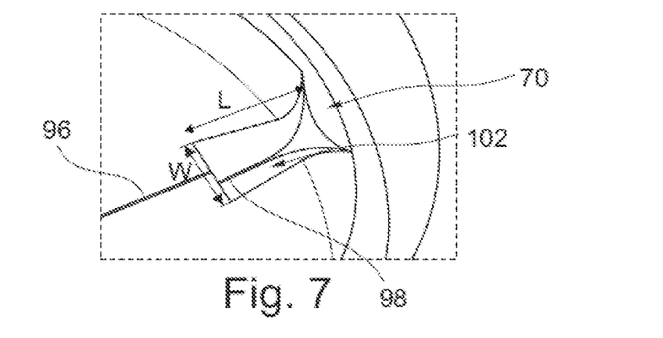
FIG. 7 is a detailed perspective view of a recessed portion provided in a lid partition wall portion of the valve lid.
Figure 8:
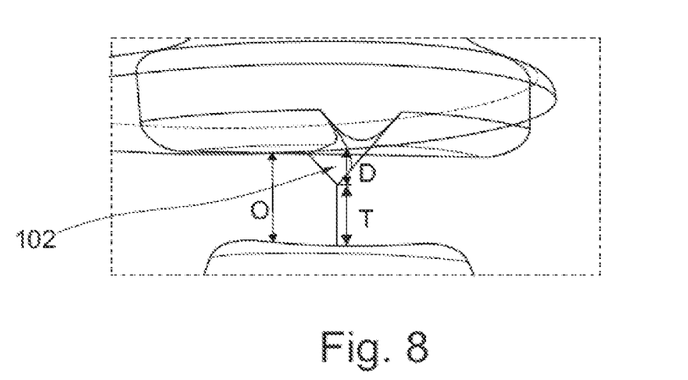
FIG. 8 is another detailed perspective view of the recessed portion provided in the lid partition wall portion of the valve lid.

FIG. 7 and FIG. 8 particularly show the first recessed portion 102, in which the first slit end 98 is arranged. The first recessed portion 102 and the second recessed portion 104 are examples of weakened portions according to the present disclosure and are portions of reduced material thickness in the lid partition wall portion 94. The first recessed portion 102 extends further away from the first slit end 98 in a direction corresponding to an extension direction of the slit 96. The second recessed portion 104 extends further away from the second slit end 100 in a direction corresponding to the extension direction of the slit 96, with reference also to FIG. 4. The first recessed portion 102 defines or determines a defined tear or crack-growth direction starting from the first slit end 98 and the second recessed portion 104 defines or determines a defined tear or crack-growth direction starting from the second slit end 100. The first recessed portion 102 and the second recessed portion 104 make it possible to guide or direct tears, or cracks, propagating from the first slit end 98 and from the second slit end 100 into desired directions when an instrument or tool is inserted into the instrument insertion passage 88 via the slit 96.

As can be seen in FIG. 5 and in particular in FIG. 7, which is a detailed top view of the first recessed portion 102, the first recessed portion 102 is not interconnected with the second recessed portion 104 and is thus separate from the second recessed portion 104. It is however possible according to the present disclosure to provide one single recess crossing the entire lid partition wall portion 94 by connecting the first recessed portion 102 and the second recessed portion 104. This embodiment is indicated via a dashed lines shown in FIG. 4, which connect the first recessed portion 102 and the second recessed portion 104. In this case the slit 96 would be surrounded by the one single recess and the first and second recessed portions 102 and 104 would be portions, in particular end portions, of said one single recess.

The first recessed portion 102 and the second recessed portion 104 anyway extend from the respective slit ends 98, 100 towards the radial outer lid attachment portion 70. FIG. 5 shows dashed lines indicating a transition between the lid attachment portion 70 and the partition wall portion 94. Since the radial outer lid attachment portion 70 extends axially, in particular axially away from the lid partition wall portion 94 both towards a proximal side 106 and a distal side 108, the lid attachment portion 70 constitutes a particularly reinforced portion limiting and preventing further crack growth, particularly in case a large crack forms when the instrument or tool is inserted into the biopsy valve 22.

The formation/design of the first recessed portion 102 and the second recessed portion 104 is in particular shown in FIG. 6, FIG. 7 and FIG. 8. The recessed portions can be molded with the lid. The slit may be die-cut after molding. The slit and perforations used as weakened portions can also be laser-cut. The first recessed portion 102 and the second recessed portion 104 have both a chocolate-bar like groove shape with an essentially triangular cross-section when viewed in a crack-growth direction. A tip 110 of the triangular cross-section forms a bottom of the recessed portions 102, 104. The slit ends 98, 100 are provided especially preferred at the tip 110 of the triangular cross-section, so that the crack-growth direction starting from the slit ends 98, 100 is defined by the tip 110 of the triangular cross-section. A width W of the first and second recessed portions 102, 104 (measured at the proximal surface) may e.g. be around 0.5 mm. A length L of the first and second recessed portions 102, 104 may e.g. be around 0.9 mm. A depth D of the first and second recessed portions 102, 104 may e.g. be around 0.2 mm. A material thickness T of the lid partition wall portion 94 may e.g. be around 0.5 mm in the first and second recessed portions 102, 104. This means that the overall material thickness O of the lid partition wall portion 94 in non-recessed portions, adjacent the recessed portions, is preferably around 0.7 mm (O=D+T), which is also the depth of the slit 96. The parameters W, L, D, T, O may arbitrarily varied, however for the parameters D and O, it is preferred if they meet the formula D/O>25%. As shown, the lid partition wall portion 94 has a convex shape on the proximal side. The thickness at the center of the lid partition wall portion 94 may be equal to or less than 1.3 mm, preferably equal to or less than 1.1 mm.

With reference back to FIG. 4, FIG. 5 and FIG. 6, the first recessed portion 102 and the second recessed portion 104 are arranged at the proximal side 106 of the lid partition wall portion 94. The lid partition wall portion 94 is basically a round/circular wall extending perpendicularly to an axial direction of the biopsy valve 22/to the instrument insertion passage 88. The lid partition wall portion 94 comprises a first, distal, wall surface 112 and a second, proximal, wall surface 114. A first diameter D1 of the distal wall surface 112 is smaller than a second diameter D2 of the proximal wall surface 114. The first recessed portion 102 and the second recessed portion 104 are formed on the proximal wall surface 114. A length L1 of the slit 96 is shorter than the first diameter D1. When a crack grows in the crack growth directions defined or determined by the first and second recessed portions 102, 104, the crack growth is first prevented or slowed at the distal side 108 of the lid partition wall portion 94 and the crack growth mainly continues at the proximal side 106 of the lid partition wall portion 94 due to the bigger second diameter D2 until the crack also reaches the periphery of the lid partition wall portion 94 at the proximal side 106. Therefore, the crack growth/propagation is suitably guided into the radial outer lid attachment portion 70 of the valve lid 60 and limited or stopped there due to an increasing wall thickness provided in particular in the axial direction.

With reference in particular to FIG. 5, the valve lid 60 comprises a distal chamber or cavity or recess 116 below the lid partition wall portion 94, i.e. on the distal side 108 of the lid partition wall portion 94. The distal chamber 116 has the shape of a truncated cone such that the distal chamber 116, in particular a circumferential wall 118 of the distal chamber 116, tapers or narrows towards the lid partition wall portion 94. Therefore, a diameter of a circumferential wall 118 of the distal chamber 116 basically corresponds to the first diameter D1 directly adjacent the lid partition wall portion 94 and continuously increases in a direction away from the lid partition wall portion 94. The lid partition wall portion 94 is thus suitably supported by the radial outer lid attachment portion 70 from below, in particular when suction is applied to the working channel 14.

As can be further seen in FIG. 5, the valve lid 60 further comprises a proximal chamber or cavity or recess 120 proximally with respect to the lid partition wall portion 94, i.e. on the proximal side 106 of the lid partition wall portion 94. The second diameter D2 of the proximal wall surface 114 of the lid partition wall portion 94 corresponds to a diameter of a cylindrical surface/portion 122 of the proximal chamber 120 directly adjacent the lid partition wall portion 94. The cylindrical portion 122 is essentially perpendicular to the lid partition wall portion 94. The proximal chamber 120 further has an annular protective collar portion 124 axially adjacent the cylindrical portion 122 and projecting radially inward with respect to the cylindrical portion 122. The proximal chamber 120 further has a funnel-shaped instrument guide portion 126 axially adjacent the collar portion 124. The funnel-shaped instrument guide portion 126 guides the tool or instrument to be inserted into the biopsy valve 22 directly towards the slit 96. Further, the protective collar portion 124 guides the tool or instrument centrally towards the slit 96 so that the tool or instrument does not enter the slit 96 at a position too close to the slit ends 98, 100 and thus too close to the recessed portions 102, 104, and further prevents tools or instruments having a diameter too large for the valve lid 60 of the biopsy valve 22 from entering the biopsy valve 22 through the slit 96.

FIG. 9 is another depiction of the valve lid 60 showing the attachment portion 70, having a peripheral wall 71 from which the outward protruding portions 76 and 78 extend to define the annular groove 80, the proximal chamber 120 and the distal chamber 116. The proximal wall surface 114 and the distal wall surface 112 of the lid partition wall 94 are also shown. FIG. 10 is a cross-section view B-B showing the first and second slit ends 98, 100, and the first and second recessed portions 102, 104. The peripheral wall 71 has outer and inner peripheral surfaces 71a, 71b. The lid partition wall 94 extend inwardly from the inner peripheral surface 71b. The first and second slit ends 98, 100 are adjacent the inner-most portions of the first and second recessed portions 102, 104. In the present embodiment, the first and second slit ends 98, 100 are arranged in the first and second recessed portions 102, 104.

Figure 11:
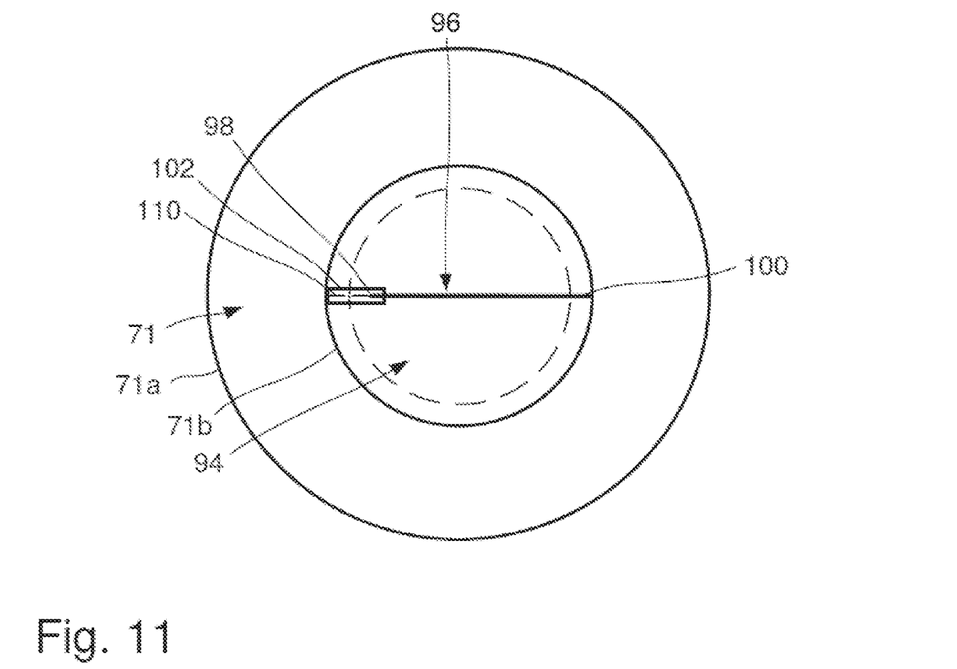
Figure 12:
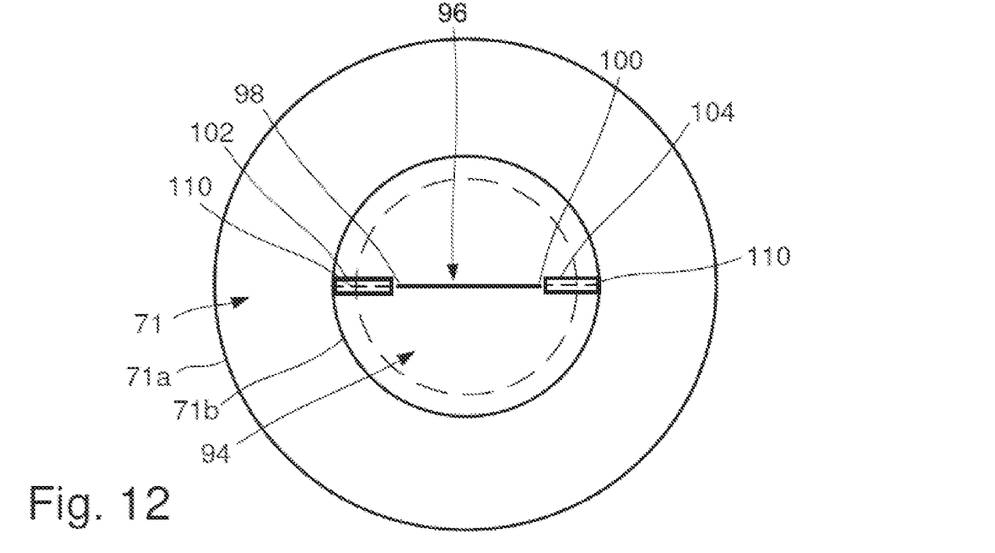

FIG. 11 shows a variation of the embodiment described with reference to FIGS. 5, 9 and 10. In this variation, there is only one recessed portion. The first slit end 98 is adjacent the inner-most portion of the first recessed portion 102, in the present variation arranged in the first recessed portion 102. The area surrounding the second slit end 100 can be reinforced, or not. In other variations, the first slit end 98 can be adjacent but not arranged in the first recessed portion, for example contacting the inner-most portion of the first recessed portion 102 or not quite contacting the inner-most portion of the first recessed portion 102, as shown in FIG. 12, thus leaving a very thin wall of material that is easily torn when the instrument or tool is inserted. These variations also accomplish the function of propagating a tear in a predetermined direction, and these variations can be combined in any manner. Additionally, the recessed portions can be replaced by perforated lines to create the weakened portions, as described above. While preferably the tear direction extends in a straight line from the slit, the tear direction can deviate from the plane on which the slit lies and still achieve the desired functionality. For example, the tear direction defined by the tip, or bottom, 110 of the recessed portion can be placed at a narrow angle from the plane, so long as a flap is not formed by the tear which produces the negative effects described above. For example the tear direction can be less than +/−30 degrees, preferably less than +/−20 degrees, and even more preferably +/−10 degrees, from the plane.

Figure 13:
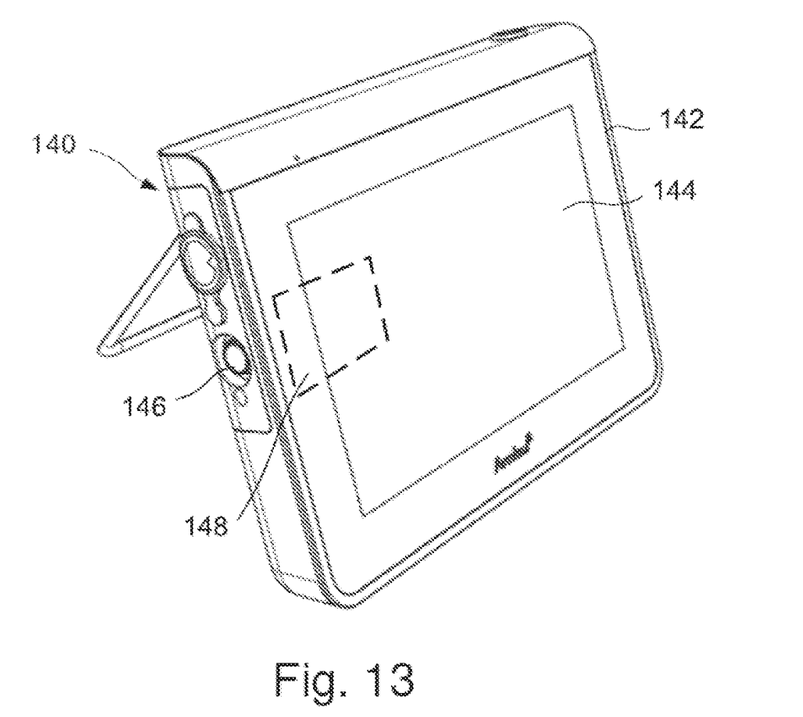
FIGS. 13 and 14 are views of example monitors.
Figure 14:
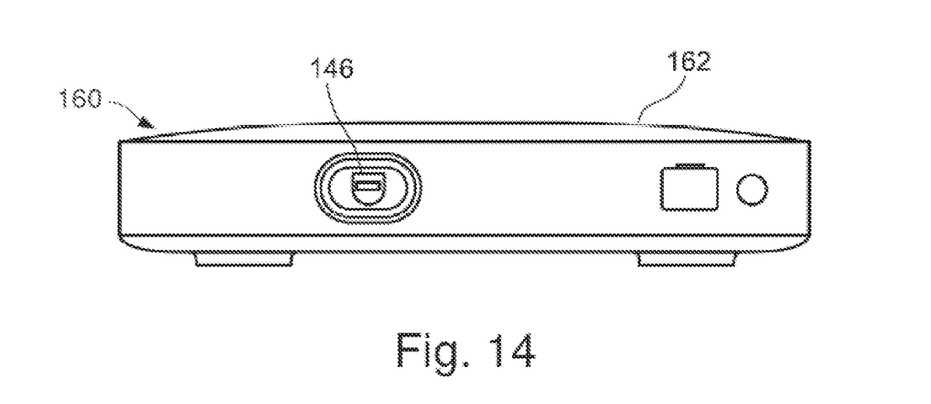

FIGS. 13 and 14 illustrate examples of the monitor 26, denoted by numerals 140 and 160. In FIG. 9, the monitor includes a housing 142 enclosing and supporting a display screen 144 and a video processing circuit (not shown). The display screen 144 may be a touch-screen. A cable socket 146 receives a cable connector of a cable of the endoscope 2 to establish a signal communication between the image sensor and the monitor. The monitor allows an operator to view an image captured by the image sensor. A medical device interface 148 is tailored to a specific endoscope technology, such as a type or model of image sensor, electronic circuits to encode other endoscope signals, configuration parameters of the image sensor, and the like. The medical device interface 148 is connected to the video processing circuit and can pre-process signals before conveying them to the video processing circuit. For example, the medical device interface 148 may deserialize a video signal or modify the size of the frames. Thus, the medical device interface 148 is technologically matched to a particular endoscope, and inclusion of the medical device interface 148 in the monitor 26, 140, 160 matches the endoscope to the monitor. As shown in FIG. 13, the monitor may comprise multiple cable sockets 146 and, correspondingly, multiple medical device interfaces 148, which may be coded to indicate which endoscope matches which medical device interface. Coding may be via symbols, colors, or both. Example medical device interfaces and codings are described in commonly owned U.S. Pat. Nos. 11,166,622 and 11,166,624, both issued Nov. 9, 2021 and incorporated herein by reference.

It might not be desirable to provide a video display screen with a touch screen, or it might be desirable to omit a display screen altogether. Omission of the display screen might be beneficial to take advantage of evolving video display technologies which improve resolution and reduce cost. Provision of exchangeable medical device interfaces allows for adoption of evolving image sensor and endoscope technologies, thus use of existing or future-developed external video displays could allow presentation of higher resolution or otherwise improved video. Use of external video displays could also leverage existing capital investments. Accordingly, in FIG. 10 the monitor 160 comprises a housing 162 supporting a video processing circuit (not shown), a medical device interface, and cable socket 146, but excludes a display screen.

The following items are further variations and examples of the embodiments described with reference to FIGS. 1 to 14.

1. Endoscope (2) comprising: an handle (4); and an insertion cord (6) configured to be inserted into a patient's body cavity; the handle (4) comprising: a working channel access port (16) providing access to a working channel (14) extending from the handle (4) to a distal tip unit (12) of the insertion cord (6); and a biopsy valve (22) attached or attachable to the working channel access port (16) and configured to close and seal the working channel access port (16) while allowing insertion of a tool or instrument into the working channel (14); the biopsy valve (22) comprising: a valve body (58) attached or attachable to the working channel access port (16); and a valve lid (60) configured to be detachably attached to the valve body (58); wherein the valve lid (60) comprises a self-closing slit (96) which is formed or configured so as to close and seal the working channel access port (16) and which provides a passageway for insertion of the tool or instrument; and wherein the self-closing slit (96) comprises at least one slit end (98, 100) arranged in a weakened portion determining a defined crack-growth direction starting from the at least one slit end (98, 100).

2. Endoscope (2) according to item 1, wherein the self-closing slit (96) is formed as a single, straight slit extending linearly, i.e. in a straight line.

3. Endoscope (2) according to item 1 or 2, wherein the self-closing slit (96) comprises: a first slit end (98) arranged in a first weakened portion determining a first defined crack-growth direction starting from the first slit end (98); and a second slit end (100) arranged in a second weakened portion determining a second defined crack-growth direction starting from the second slit end (100).

4. Endoscope (2) according to item 3, wherein the first defined crack-growth direction is a direction opposite of the second defined crack-growth direction.

5. Endoscope (2) according to any one of the preceding items 1 to 4, wherein the valve lid (60) comprises a radial outer attachment portion (70) detachably attachable to the valve body (58) by inserting the valve lid (60) into the valve body (58) and a radial inner partition wall portion (94), wherein the self-closing slit (96) and the weakened portion are arranged in the radial inner partition wall portion (94) and the weakened portion extends in the defined crack-growth direction towards and into the radial outer attachment portion (70).

6. Endoscope (2) according to item 5, wherein the partition wall portion (94) comprises a first distal wall surface (112) and a second proximal wall surface (114), wherein a first diameter of the first distal wall surface (112) is smaller than a second diameter of the second proximal wall surface (114) so that the radial outer attachment portion (70)— directly adjacent the partition wall portion (94)— extends further inward on a distal side (108) of the partition wall portion (94) than on a proximal side (106) of the partition wall portion (94), and a length of the self-closing slit (96) is smaller than the first diameter.

7. Endoscope (2) according to item 5 or 6, wherein the valve lid (60) comprises a distal chamber or cavity (116) defined by the partition wall portion (94) and the attachment portion (70) and arranged on a distal side (108) with respect to the partition wall portion (94), the distal chamber or cavity (116) having the shape of a truncated cone such that the distal chamber or cavity (116), in particular a circumferential wall (118) of the distal chamber (116), tapers towards the partition wall portion (94).

8. Endoscope (2) according to any one of items 5 to 7, wherein the valve lid (60) comprises a proximal chamber or cavity (120) defined by the partition wall portion (94) and the attachment portion (70) and arranged on a proximal side (106) with respect to the partition wall portion (94), the proximal chamber or cavity (120) having a cylindrical portion (122) axially adjacent the partition wall portion (94), a protective collar portion (124) axially adjacent the cylindrical portion (122) and projecting radially inward with respect to the cylindrical portion (122) and a funnel-shaped instrument guide portion (126) axially adjacent the collar portion (124).

9. Endoscope (2) according to any one of the preceding item 1 to 8, wherein the weakened portion in which the at least one slit end (98, 100) is arranged, is a recessed portion (102, 104), i.e. a portion of reduced material thickness.

10. Endoscope (2) according to item 9, wherein the recessed portion (102, 104) has a groove shape with an essentially triangular cross-section when viewed in the crack-growth direction determined by the recessed portion (102, 104).

11. Endoscope (2) according to item 9 or 10, wherein the self-closing slit (96) comprises: a first slit end (98) arranged in a first recessed portion (102), i.e. a portion of reduced material thickness, determining a first defined crack-growth direction starting from the first slit end (98); and a second slit end (100) arranged in a second recessed portion (104), i.e. a portion of reduced material thickness, determining a second defined crack-growth direction starting from the second slit end (100).

12. Endoscope (2) according to item 11, wherein the first recessed portion (102) and the second recessed portion (104) are portions of one single elongated recess surrounding the self-closing slit (96).

13. Endoscope according to item 11 or 12, wherein the first recessed portion (102) and the second recessed portion (104) are arranged on a proximal wall surface (114) of the partition wall portion (94).

14. Endoscope according to any one of the preceding items 1 to 13, wherein the biopsy valve (22) is an integral part, and the valve body (58) and the valve lid (60) are connected via a strap (84).

15. System comprising: an endoscope (2) according to any one of the preceding items 1 to 14; and a monitor (26).

LIST OF REFERENCE NUMBERS 2 endoscope
4 handle
6 insertion cord
8 insertion tube
10 bending section
12 distal tip unit
14 working channel
16 working channel access port
18 working channel tube
20 Y-connector
22 biopsy valve
24 operating unit
26 monitor
28 first branch or socket
30 first opening
32 first channel
34 second branch or socket
36 second opening
38 second channel
40 third joined channel
42 third branch or socket
44 third opening
46 instrument insertion channel
48 suction channel
50 suction tube
52 access port engagement portion
54 bulged rim or barb portion
56 annular groove portion
58 valve body
60 valve lid
62 body engagement portion
64 body projecting portion
66 body groove portion
68 second valve body engagement portion
70 lid engagement/attachment portion
71 annular lid wall
72 body projecting portion
74 body groove portion
76 first radially outward protruding portion
78 second radially outward protruding portion
80 annular groove portion
82 proximal end surface
84 strap
86 handle portion
88 instrument insertion passage
90 body partition wall portion
92 central constricted opening/hole
94 lid partition wall portion
96 slit
98 first slit end
100 second slit end
102 first recessed portion
104 second recessed portion
106 proximal side
108 distal side
110 tip
112 first distal/lower wall surface
114 second proximal/upper wall surface
116 distal chamber
118 circumferential wall
120 proximal chamber
122 cylindrical portion
124 collar portion
126 funnel-shaped instrument guide portion

We claim:

1. An endoscope comprising:
   an insertion cord configured to be inserted into a patient's body cavity, the insertion cord including a distal tip unit;
   a handle, the insertion cord extending from the handle, and the handle including a working channel access port providing access to a working channel extending from the handle to the distal tip unit of the insertion cord; and
   a biopsy valve attached or attachable to the working channel access port and configured to close and seal the working channel access port while allowing insertion of a tool or instrument into the working channel, the biopsy valve including:
   a valve lid comprising a lid partition wall and an insertion passage traversed by the lid partition wall, the lid partition wall including a first weakened portion and a slit, the slit formed or configured so as to close the insertion passage and provide a passageway for insertion of the tool or instrument, the slit comprising a first slit end adjacent to the first weakened portion, the first weakened portion configured to tear in a first, predetermined, tear direction starting from the first slit end.

2. The endoscope of claim 1, wherein the slit is formed as a single, straight slit extending linearly.

3. The endoscope of claim 1, wherein the first slit end is arranged in the first weakened portion.

4. The endoscope of claim 1, wherein the lid partition wall comprises a proximal wall surface and a distal wall surface opposite the proximal wall surface, wherein a diameter of the distal wall surface is smaller than a diameter of the proximal wall surface, and wherein a length of the slit is smaller than the diameter of the distal wall surface.

5. The endoscope of claim 1, wherein the lid partition wall comprises a proximal wall surface and a distal wall surface opposite the proximal wall surface, wherein the slit extends between and connects the proximal wall surface and the distal wall surface, wherein a distance between the proximal wall surface and the distal wall surface, measured parallel to a longitudinal axis of the insertion passage along the slit, defines a lid partition wall thickness, and wherein the first weakened portion comprises a recess, a thickness of the lid partition wall in the first weakened portion, measured parallel to the longitudinal axis of the insertion passage, being smaller than the thickness of the lid partition wall thickness adjacent to the first weakened portion.

6. The endoscope of claim 1, wherein the first weakened portion comprises a recess comprised by a portion of the lid partition wall having a reduced material thickness relative to a remainder of the lid partition wall.

7. The endoscope of claim 6, wherein the recess has a groove shape with a triangular cross-section when viewed in the first tear direction.

8. The endoscope of claim 1, wherein the lid partition wall further includes a second weakened portion and a second slit end adjacent to the second weakened portion, the second weakened portion configured to tear in a second, predetermined, tear direction starting from the second slit end.

9. The endoscope of claim 8, wherein the second slit end is arranged in the second weakened portion.

10. The endoscope of claim 8, wherein the first tear direction is a direction opposite of the second tear direction.

11. The endoscope of claim 1, further comprising a valve body attached or attachable to the working channel, wherein the valve lid is configured to be detachably attached to the valve body.

12. The endoscope of claim 11, wherein the valve lid comprises an attachment portion detachably attachable to the valve body by inserting the attachment portion into the valve body, and wherein the first weakened portion extends in the first tear direction to the attachment portion.

13. The endoscope of claim 1, wherein the insertion passage comprises a distal chamber arranged on a distal side with respect to the lid partition wall, the distal chamber having a truncated cone shape that tapers towards the lid partition wall.

14. The endoscope of claim 13, wherein the valve lid comprises a proximal chamber arranged on a proximal side with respect to the lid partition wall, the proximal chamber having a cylindrical portion axially adjacent the lid partition wall, a protective collar portion axially adjacent the cylindrical portion and projecting radially inward with respect to the cylindrical portion, and a funnel-shaped instrument guide portion axially adjacent the collar portion.

15. The endoscope of claim 1, wherein the lid partition wall includes a second weakened portion, wherein the slit comprises the first slit end adjacent to the first weakened portion, a second slit end adjacent to the second weakened portion, wherein the second weakened portion is configured to tear in a second, predetermined, tear direction starting from the second slit end, wherein the first weakened portion comprises a first recess defining the first tear direction, and wherein the second weakened portion comprises a second recess defining the second tear direction.

16. The endoscope of claim 15, wherein the first recess and the second recess are portions of a single elongate recess surrounding the slit.

17. The endoscope of claim 15, wherein the first recess and the second recess are arranged on a proximal wall surface of the lid partition wall.

18. The endoscope of claim 1, wherein the valve lid is formed from a silicone rubber material having a tear strength equal to or less than 40 Nm/mm, and a maximum thickness of the lid partition wall is equal to or less than 1.2 mm.

19. A visualization system comprising:
   an endoscope according to claim 1 and further including an image sensor; and
   a monitor, the monitor including a medical device interface configured to interface with the endoscope to receive video captured by the image sensor.

20. The visualization system of claim 19, wherein the biopsy valve further comprises a valve body and a strap attaching the valve body to the valve lid.

21. A visualization system comprising:
   an endoscope comprising:
      an insertion cord configured to be inserted into a patient's body cavity, the insertion cord including a distal tip unit including an image sensor;
      a handle, the insertion cord extending from the handle, and the handle including a working channel access port providing access to a working channel extending from the handle to the distal tip unit of the insertion cord; and
      a biopsy valve attached or attachable to the working channel access port and configured to close and seal the working channel access port while allowing insertion of a tool or instrument into the working channel, the biopsy valve including a valve lid comprising a lid partition wall and an insertion passage traversed by the lid partition wall, the lid partition wall including a slit formed or configured so as to close the insertion passage and provide a passageway for insertion of the tool or instrument,
   wherein the lid partition wall comprises a proximal wall surface opposite a distal wall surface, the slit extending between and connecting the proximal wall surface and the distal wall surface, the slit extending along a slit plane,
   wherein the lid partition wall comprises a first recess extending from the proximal wall surface toward the distal wall surface, the first recess defining a first, predetermined, tear direction,
   wherein the lid partition wall comprises a second recess extending from the proximal wall surface toward the distal wall surface, the second recess defining a second, predetermined, tear direction,
   wherein the slit comprises a first slit end located adjacent the first recess and a second slit end located adjacent the second recess, and
   wherein the first tear direction and the second tear direction extend within +/−20 degrees from the slit plane.

22. The visualization system of claim 21, further comprising a monitor, the monitor including a medical device interface configured to interface with the endoscope to receive video captured by the image sensor.

* * * * *